Sept. 2, 1924.  
E. R. HEYM  
1,507,351  
COMBINATION LOCK FOR MOTOR VEHICLES  
Filed March 30, 1923  2 Sheets-Sheet 1
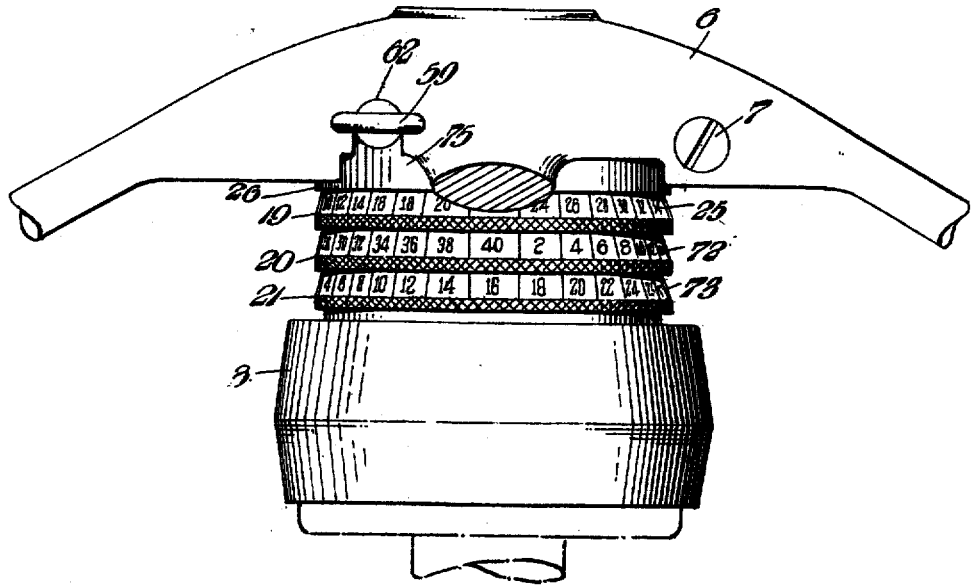
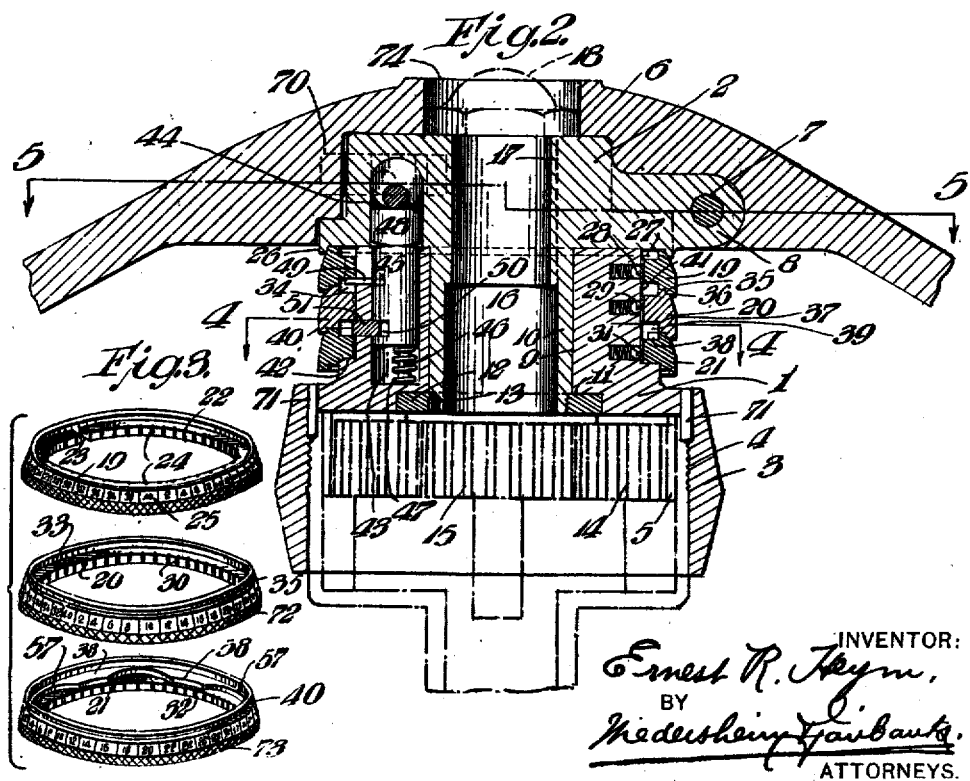
INVENTOR:  
Ernest R. Heym,  
BY  
Wedersheim Fairbanks  
ATTORNEYS.

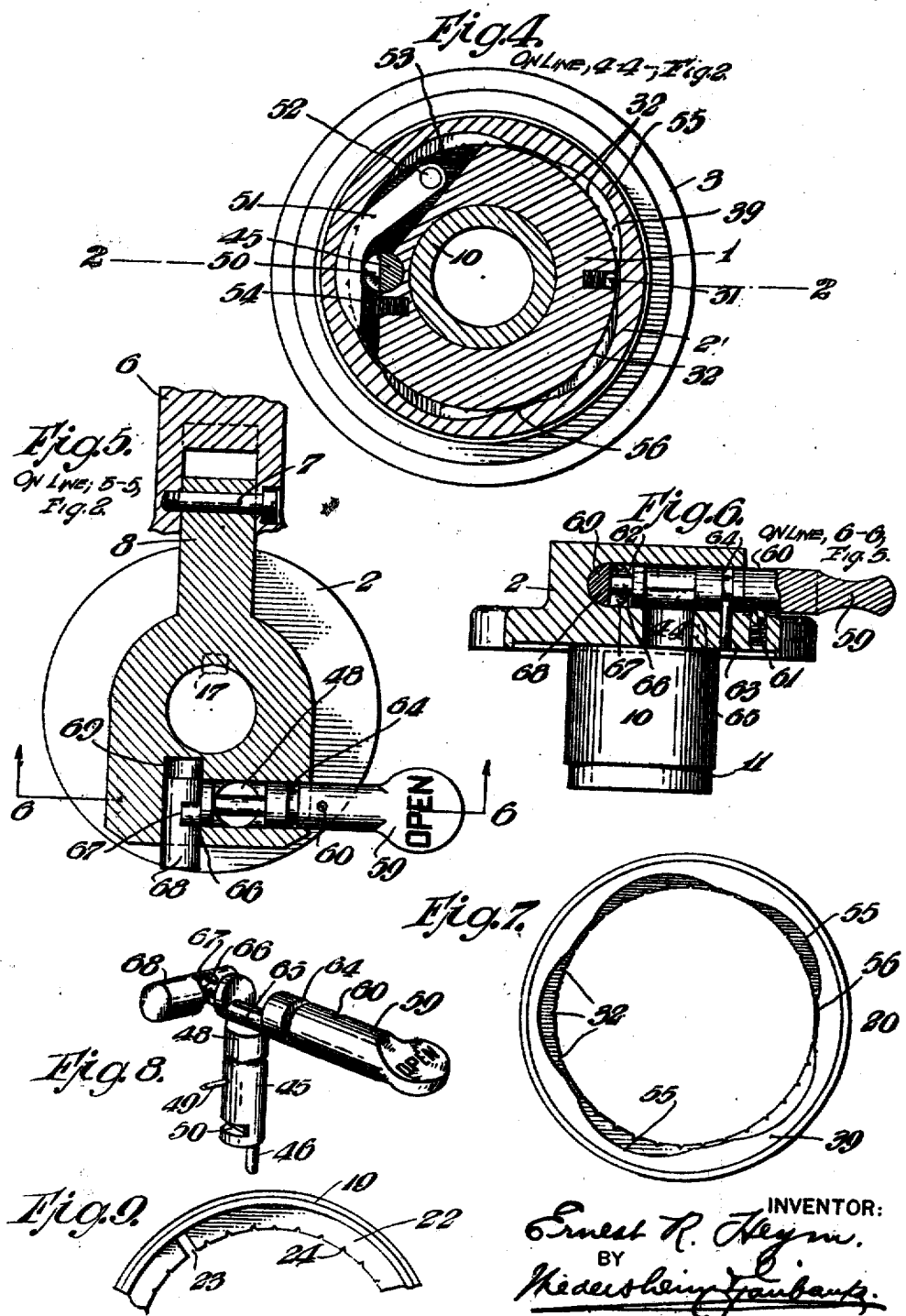

Patented Sept. 2, 1924.

1,507,351

UNITED STATES PATENT OFFICE.

ERNEST R. HEYM, OF PHILADELPHIA, PENNSYLVANIA, ASSIGNOR, BY MESNE ASSIGNMENTS, TO OTTO HERMANN, OF PHILADELPHIA, PENNSYLVANIA.

COMBINATION LOCK FOR MOTOR VEHICLES.

Application filed March 30, 1923. Serial No. 628,692.

*To all whom it may concern:*

Be it known that I, ERNEST R. HEYM, a citizen of the United States, residing at Philadelphia, county of Philadelphia, State of Pennsylvania, have invented a new and useful Combination Lock for Motor Vehicles, of which the following is a specification.

My present invention comprehends a novel construction and arrangement of a combination lock for automobiles.

It further comprehends a novel locking mechanism which is effective to lock the steering wheel in its operative position when the combination lock is in its unlocked position. The steering wheel is fulcrumed on its support and when in its unlocked position, the combination lock is in a locked position.

It further comprehends a novel construction and arrangement of combination lock wherein a locking plunger is released by means of a combination lock and its movement into locking position is controlled by means of a manually actuated key which is preferably permanently attached to the combination lock.

The locking plunger when released by the combination lock is moved into its unlocked position by means of a manually actuated key.

It further comprehends a novel combination lock wherein a plurality of combination rings are employed said rings serving to effect the locking or releasing of a locking plunger from a position to which it has been moved, said plunger being adapted to be moved into its unlocked position by means of a manually operated key which also has the function of locking the steering wheel which is fulcrumed to the lock and to effect its unlocking, whereby the steering wheel can be tilted when the combination lock is in its locked position.

Other novel features of construction and advantage will hereinafter more fully appear in the detailed description.

For the purpose of illustrating my invention, I have shown in the accompanying drawings a typical embodiment thereof which is at present preferred by me, since this embodiment will be found in practice to give satisfactory and reliable results. It is, however, to be understood that the various instrumentalities of which my invention consists can be variously arranged and organized and that my invention is not limited to the precise arrangement and organization of these instrumentalities as herein shown and described.

Figure 1 represents, in front elevation, a combination lock, embodying my invention.

Figure 2 represents a section on line 2—2 of Figure 4 but showing certain of the parts in a different relation from that seen in Figure 4.

Figure 3 represents, in perspective, a combination ring employed.

Figure 4 represents a section on line 4—4 of Figure 2, but showing a plunger locking one releasing member in its unlocked position.

Figure 5 represents a section on line 5—5 of Figure 2.

Figure 6 represents a section on line 6—6 of Figure 5.

Figure 7 represents a bottom plan view of an intermediate combination ring.

Figure 8 represents, in perspective, certain features of the locking mechanism.

Figure 9 represents a top plan view of a portion of the upper combination ring.

Similar numerals of reference indicate corresponding parts.

Referring to the drawings.

The combination lock, embodying my invention, is adapted to be secured to the steering column of a motor vehicle and with slight changes in the coupling sleeve it can be employed in conjunction with motor vehicles of different types. As illustrated, it is adapted to be employed with motor vehicles of the Ford type. The lock consists of a base block or member 1 and a top block or member 2 and their adjuncts. The base member 1 is provided with a coupling sleeve 3 which is internally threaded, as at 4, in order to be screwed onto the steering column gear casing 5. The spider of the steering wheel 6 is fulcrumed on a pin 7 which extends through the boss 8 of the top block or member 2. The base 1 is centrally apertured, as at 9, in order to receive the depending sleeve 10 of the top member 2 of the locking mechanism. The base 1 is recessed to form an annular space 11 in which is free to rotate a locking nut 12 which is in threaded engagement with the sleeve 10 and a vertically disposed screw 13 locks the nut 12 in its adjusted position with respect to the sleeve 10.

The gear casing 5 which forms the head of the steering column has mounted within it the usual planetary gearing and I have shown in dotted lines, in Figure 2, the pinions 14 which are intergeared with the casing 5 and mesh with the pinion 15 carried by the steering post 16 which is keyed, at 17, to the top member 2 of the combination lock. This shaft receives at its upper end the usual nut 18. The base member 1 has rotatably mounted on its body portion a top combination ring 19, an intermediate combination ring 20 and a bottom combination ring 21.

The top ring 19 is provided with the upper annular groove 22 with a vertically disposed slot 23 and its inner periphery is provided with the recesses or depressions 24 which conform in number to the number of graduations 25 on the outer periphery of the ring. The ring has its outer wall converging inwardly so that when in assembled position, as seen in Figure 2, the upper wall of the ring 19 will have the depending flange 26 of the top 2 overhanging it. A clearance space 27 is formed between the top ring 19 and the top lock member 2. A spring-pressed ball 28 mounted in the base member 1 is adapted to interlock with the recesses 24 in the top ring 19. In a similar manner, a spring-pressed ball 29 is adapted to interlock with the recesses 30 in the inner periphery of the intermediate combination ring 20 and in a similar manner, a spring pressed ball 31 is adapted to interlock with the recesses 32 in the inner periphery of the bottom ring 21. It will thus be seen that each ring has a tension device for it so that each ring will have the same feel irrespective of the position to which it is adjusted and irrespective of whether or not it is in a locking or releasing position with respect to other portions of the locking mechanism.

The combination ring 20 is provided with the annular recess 33 so that when the ring is in assembled position an annular clearance space 34 is formed. The ring 20 is also provided at its upper portion with the annular outer recess 35 and the upper ring 19 is provided with an overhanging annular flange 36, see Figure 2. The intermediate ring 20 is provided with an annular recess 37 in its bottom face which contributes with an annular recess 38 in the top face of the bottom ring 21 to form an annular clearance space 39. The intermediate ring 20 is provided with the annular flange 40 which overhangs the bottom ring 21.

The base member 1 is of reduced diameter, as at 41, in order to rotatably receive the combination rings 19, 20 and 21 which fit the space between the top member 2 and the shoulder 42. It will be seen that each of these rings has an overhanging portion so that there is no possibility of inserting a prying bar between then or the juxtaposed parts.

The base member 1 is provided with a vertically disposed aperture 43 which opens through its top and is in alignment with an aperture 44 of larger diameter in the top member 2.

45 designates a locking plunger having at its bottom a guide pin 46 which is encircled by the spring 47, the tendency of which is to move the locking plunger 45 upwardly into the aperture 44 which opens through the bottom of the top casing member 2. Within the aperture 44 is disposed a releasing block 48. The locking plunger 45 has secured to it a laterally extending pin 49 and it is also provided with a slot 50 into which is adapted to pass a locking arm 51 which is loosely mounted at one end on a pin 52. The base member 1 of the casing of the locking mechanism is slotted, as indicated at 53, in order to receive the locking arm 51. This locking arm 51 is acted upon by a spring 54 carried by the base member 1 and tending to move the free end of such arm outwardly against the inner periphery of both the intermediate combination ring 20 and the bottom combination ring 21. The bottom face of the intermediate ring is recessed to form a plurality of cam faces 55 preferably equally spaced from each other and, as shown, there are five of these cam faces, the juxtaposed cam faces being connected by the surfaces 56. In a similar manner, the bottom combination ring 21 is recessed in its top face to form a plurality of cam faces 57 which, as illustrated are five in number, and juxtaposed cam faces are connected by the curved faces 58. The arm 51 has its outer periphery curved at its free end so that when the intermediate and bottom combination rings have two of their recesses registering, the spring 54 will move the arm 51 into the position seen in Figure 4 so as to release the locking plunger or bolt 45. Each of the combination rings has a portion of the outer periphery thereof knurled, in order to facilitate their manipulation. The locking bolt 45 when released has a tendency to move upwardly due to the provision of the spring 47 and I provide means to control such upward movement.

In the embodiment illustrated, this is accomplished by means of a manually actuated key 59 which is provided on opposite sides with notches or recesses 60 with which are adapted to interlock the spring pressed ball 61 in order to retain the key in its open or closed position. The top member 2 of the casing is provided with a laterally extending aperture 62 into which the key is adapted to pass and if desired the key may be permanently fixed in position by means of a pin 63 carried by the top casing member 2 and extending into an annular groove 64 in the key 59.

The key near its forward end is cut away to form an eccentric 65 which is adapted to bear on the member 48. The forward end of the key 59 terminates in a pin 66 which is eccentrically disposed with respect to the longitudinal axis of the key 59 and when the key is in position, as shown in Figures 5, 6 and 8, the eccentric formed by the pin 66 extends into a slot 67 in a locking member 68 which is in the form of a cylindrical rod slidably mounted in an aperture 69 and adapted to move into the recess 70 in the spider of the wheel 6, in order to lock such spider with respect to the top casing member 2.

When the coupling sleeve 3 has been screwed into position on the gear casing, as shown in Figure 2, it is fixedly assembled thereto after the wedging pins 71 have been driven into position, as seen in Figure 2. The intermediate ring 20 is provided with graduations 72 similar to those of the graduations 25 on the top ring 19 and in a similar manner the bottom ring 21 is provided with the graduations 73. The number of these graduations may vary but, as illustrated, each of the rings is provided with forty graduations.

The operation of my novel combination lock will now be apparent to those skilled in the art to which this invention appertains and is as follows:—

The base member 1 of the casing of the lock is secured to the gear casing of the steering column by means of the coupling sleeve 3 and the hardened wedging pins 71 are then driven into position thus preventing the removal of the combination lock from the steering column as the lock is now permanently connected to such steering column.

Prior to securing the lock to the steering column, the bottom casing section 1 and the top casing section 2 are secured together by screwing into position the nut 12 after which the screw 13 is inserted thus securing the casing sections together and enabling the top casing section to be capable of rotation on the bottom casing section.

When the locking plunger 45 is in its unlocked position, the locking member 68 is in its locked position so that the upper casing member 2 and thereby the steering shaft keyed thereto is capable of rotation by means of the steering wheel. When the locking plunger 45 is in its locked position to lock the casing sections together then the locking member 68 is in its unlocked position and the steering wheel can be tilted on its fulcrum 7 and thus render it easier for the driver to enter or to leave his seat. In order to provide for this tilting of the steering wheel the hub thereof is apertured, as at 74, and in order to provide a stronger lock between the steering wheel and the top casing sections, the latter is provided between the spokes of the steering spider with the upwardly projecting flanges 75, as shown in Figure 1.

If the operator now desires to lock the combination he brings the combination rings 19, 20 and 21 into the relation corresponding to the combination whereupon the pin 49 will register with the slot 23 in the top ring 19 and the locking arm 51 will be moved into the position seen in Figure 4, whereupon the spring 47 will move the locking plunger 45 upwardly into its locked position when the key 59 has been turned from the position seen in Figure 2 into its open position. At the same time, if the locking member 68 is employed, the turning of the key 59 will move the locking member 68 from the recess 70 into its unlocked position so that the steering wheel can be tilted.

When the operator desires to unlock the combination, the combination rings 19, 20 and 21 are brought into registering position for the predetermined combination and the key 59 is then turned so that its eccentric position 65 bearing on the member 48 will move the locking plunger 45 downwardly into its unlocked position. If one of the rings 20 or 21 is then partially turned, the locking arm 51 will pass into the slot 50 in the locking plunger. If the top ring is turned, the pin will pass beneath the top ring 19 and thus prevent the upward movement of the plunger 45 in case the key 59 should be turned. It will thus be seen that all of the rings must be brought into proper register conforming to a predetermined combination before the locking or unlocking action can be effected.

It will of course be understood that when the locking bolt 45 is in its locked position, the locking arm 51 will be positioned beneath it and thus positively retain it in locked position, so that both the pin and locking arm co-operate to retain the locking plunger in its locked or unlocked position.

It is not necessary in all cases to employ a tiltable steering wheel and if desired the steering wheel spider can be fixed to or form an integral part of the upper casing section 2 and still be within the spirit and scope of my invention. In such case, the eccentric 66 on the key and the locking member 68 can be dispensed with.

The casing sections and the locking rings as well as the wedging pins 71 are hardened so that the lock cannot be opened by hammering, sawing, chiselling or the like, and the locking rings and their co-operating parts overlap each other so that the lock cannot be separated by a prying action.

Due to the provision of the tension devices such as 28, 29 and 31, each combination ring will have the same feel whether it has been moved into its proper or improper position, so that the combination cannot be opened by the sense of touch, as there are no detents or plungers which will create a noise when they are actuated.

Attention is directed to the function and utility of the pressure member 48. It will be noted that this member is of greater diameter than that of the plunger 45 so that it will be at all times carried by the top section casing 2. The underface of this pressure member 48 is preferably rounded so that it will readily clear during the rotation of the upper casing section. This member has only an up and down movement and serves to transmit the pressure of the key to the plunger. Although it is not necessary in all cases to employ this member 48, it is of advantage since it enables one to reduce the size of the upper casing section.

It will be apparent that I have devised a novel and useful combination lock for motor vehicles which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:

1. In a combination lock, a lower casing section, an upper casing section connected therewith and capable of relative rotation with respect thereto, a locking plunger mounted in one of said sections, yielding means tending to move said locking plunger to cause it to engage the other casing section, a plurality of combination rings operatively connected with said locking plunger to retain it in its locked and unlocked position and to release it from its unlocked position, and manually actuated means to move said locking plunger into its unlocked position.

2. In a combination lock, a lower casing section, an upper casing section connected therewith and capable of relative rotation with respect thereto, a locking plunger mounted in one of said sections, yielding means tending to move said locking plunger to cause it to engage the other casing section, a plurality of combination rings operatively connected with said locking plunger to retain it in its locked and unlocked position and to release it from its unlocked position, manually actuated means to move said locking plunger into its unlocked position, and tension means for said rings to give them the same feel in any position to which they are adjusted.

3. In a combination lock, casing sections incapable of relative longitudinal movement but capable of relative rotation, a locking plunger carried by one of said casing sections and adapted to engage the other casing section, yielding means to effect the movement of the plunger into locked position, a plurality of combination rings rotatably mounted on one of said casing sections, a pivoted arm controlled by a plurality of said rings to be moved into engagement with said plunger to retain it in its unlocked position, yielding means to disengage said arm from said plunger, and means to move said plunger into its unlocked position.

4. In a combination lock, casing sections connected together to be incapable of relative longitudinal movement but capable of relative rotation, one of said sections being adapted to be fixedly supported, a locking plunger to lock said sections together, yielding means to cause such movement of such plunger, a second locking plunger, combination controlled means to release said first plunger to permit it to move into locked or unlocked position, and a key to cause the unlocking movement of said casing section plunger and at the same time to actuate said second locking plunger.

5. In a combination lock, casing sections connected together to be incapable of relative longitudinal movement but to be capable of relative rotation, one of said sections being adapted to be fixedly supported, a plunger carried by one section, yielding means to move said plunger to cause it to engage the other section, a plurality of combination rings operatively connected with said plunger to retain said plunger in its locked or unlocked position and to release it to permit it to move, and a manually actuated key having an eccentric to effect the movement of said plunger into its unlocked position.

6. In a combination lock, casing sections connected together to be incapable of relative longitudinal movement but capable of relative rotation, a locking plunger to interlock said sections, resilient means to move said plunger in one direction, a plurality of combination rings rotatably mounted on one of said sections, a movable locking arm controlled by certain of said rings to cause said arm to engage said plunger to retain it in its locked or unlocked position, and a manually actuated key to effect the movement of said plunger in one direction and to permit said resilient means to move said plunger in an opposite direction.

7. In a combination lock, casing sections connected together to be incapable of relative longitudinal movement but capable of relative rotation, a locking plunger to interlock said sections, resilient means to move said plunger in one direction, a plurality of combination rings rotatably mounted on one of said sections, a movable locking arm controlled by certain of said rings to cause said arm to engage said plunger to retain it in its locked or unlocked position, a manually actuated key to effect the movement of said plunger in one direction and to permit said resilient means to move said plunger in an opposite direction, and a locking plunger controlled by said key.

8. In a combination lock, casing sections connected together to be incapable of relative longitudinal movement but capable of relative rotation, and each having an aperture adapted to be brought into register with each other, a locking plunger slidable in said apertures, yielding means to move said plunger in one direction, a key to move said plunger in the opposite direction when released, a pressure piece between said key and plunger, a spring pressed arm to retain said plunger in its locked and unlocked position and its release from such positions, and a plurality of combination rings having cam faces to move said arm in one direction against the pressure of its spring.

9. In a combination lock, casing sections connected together to be incapable of relative longitudinal movement but to be capable of relative rotation, a plunger to lock said sections together, a combination lock controlling the release of said plunger and to retain it in locked and unlocked position, yielding means to move said plunger in one direction, a second plunger, and a single key to actuate said first plunger in one direction and said other plunger in both directions.

10. In a combination lock, casing sections connected together to be incapable of relative longitudinal movement but to be capable of relative rotation, one of said sections having a coupling sleeve adapted to be permanently fixed to its support, a plunger to interlock said sections, a plurality of combination rings co-operating with said plunger, one of said rings having a slot, said plunger having a pin to co-operate with said slot, others of said rings having cam faces adapted to be brought into register, a member controlled by said cam faces to retain said plunger in its locked and unlocked position, a tension device to release said member from said plunger, yielding means to move said plunger into one direction when released, and a key to permit such movement of such plunger and to effect the movement of said plunger in an opposite direction when released.

11. In a combination lock, casing sections connected together to be incapable of relative longitudinal movement but to be capable of relative rotation, one of said sections having a coupling sleeve adapted to be permanently fixed to its support, a plunger to interlock said sections, a plurality of combination rings co-operating with said plunger, a tension device for each ring, one of said rings having a slot, said plunger having a pin to co-operate with said slot, others of said rings having cam faces adapted to be brought into register, a member controlled by said cam faces to retain said plunger in its locked and unlocked position, a tension device to release said member from said plunger, yielding means to move said plunger into one direction when released, and a key to permit such movement of such plunger and to effect the movement of said plunger in an opposite direction when released.

12. In a combination lock, casing sections connected together to be incapable of relative longitudinal movement but capable of relative rotation, a plunger operative to lock said sections together, a pressure member mounted for vertical movement to move said plunger in one direction, yielding means to move said plunger in a reverse direction, a combination lock operatively connected with said plunger to effect its release from locked and unlocked position, and means to exert a pressure against said pressure piece to effect the movement of said plunger in one direction.

ERNEST R. HEYM.

Witnesses:
H. S. FAIRBANKS,
C. D. McVAY.